April 27, 1926.
E. L. LARSON ET AL
INFLATION VALVE AND GAUGE
Filed Oct. 31, 1924
1,582,523
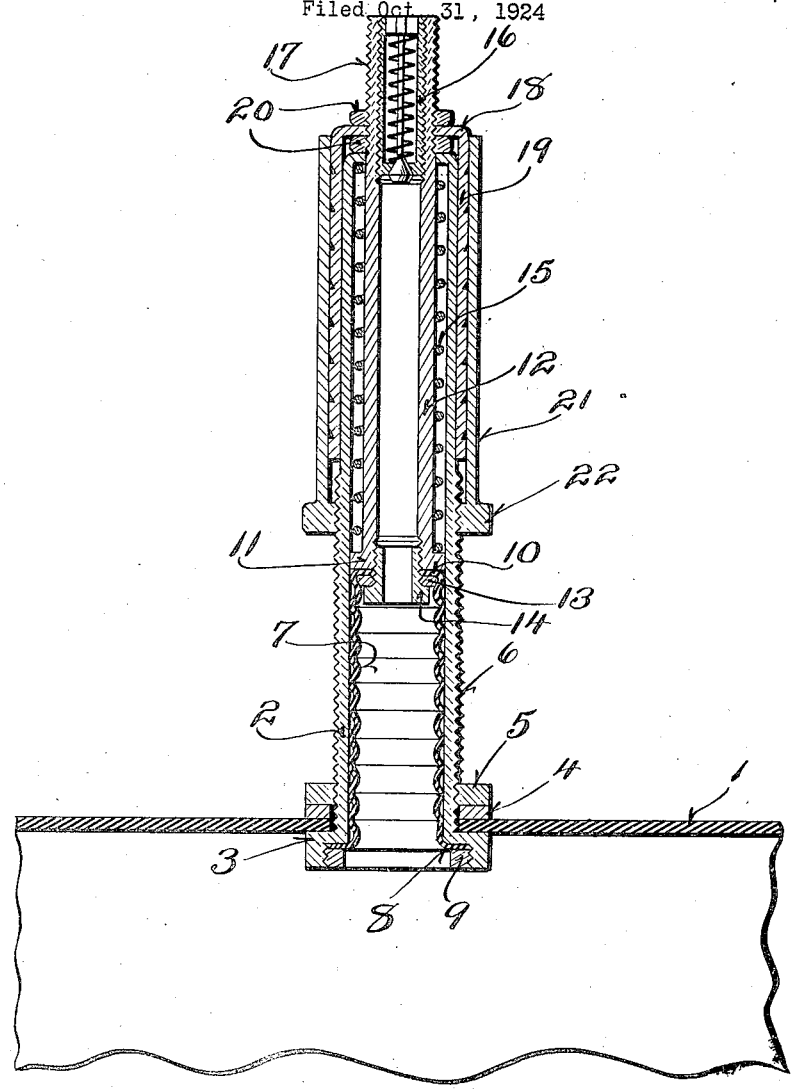
Inventors
Elmer L. Larson
Charles A. Braunger Patented Apr. 27, 1926.

1,582,523

UNITED STATES PATENT OFFICE.

ELMER L. LARSON AND CHARLES A. BRAUNGER, OF OCONOMOWOC, WISCONSIN.

INFLATION VALVE AND GAUGE.

Application filed October 31, 1924. Serial No. 747,016.

*To all whom it may concern:*

Be it known that we, ELMER L. LARSON and CHARLES A. BRAUNGER, both citizens of the United States, and residents of Oconomowoc, in the county of Waukesha and State of Wisconsin, have invented certain new and useful Improvements in Inflation Valves and Gauges; and we do hereby declare that the following is a full, clear, and exact description thereof.

This invention relates to a combined inflation valve and gauge for automobiles tires and similar devices.

In automobile practice it is the customary procedure to provide a filling tube or nipple for the tire and to use a separate and distinct device for measuring the pressure within the tire.

This invention is designed to combine these two distinct devices and to so modify them that they cooperate in a novel and effective manner to provide a suitable filling nipple and a permanently positioned gauge, whereby an operator may instantly determine the pressure on any of his tires without attaching auxiliary device and without any adjustment.

Further objects are to provide a device which may be rigidly clamped to the inner tube and to the felly, and which employs the conventional type of check valve in the filling tube so that the standard parts usually employed may also be used with this device.

An embodiment of the invention is shown in the accompanying drawings, in which:—

The single figure is a vertical sectional view through the device showing it in position with reference to an inner tube.

Referring to the drawings, it will be seen that an inner tube 1 is provided with an aperture. Within this aperture a main tube 2 is positioned, and it will be noted that this main tube is provided with a lower flange 3 positioned interiorly of the inner tube 1. This flange is clamped against the inner tube by means of a washer 4 and a nut 5, such nut cooperating with the external threads 6 of the tube 2, as illustrated. Within the main tube 2 an expansible rubber tube or member 7 is positioned. The lower ends 8 of this rubber sack or tube 7 are clamped against a recessed portion of the flange 3 by means of the annular nut 9. The upper edge of the rubber tube 7, as indicated at 10, is clamped against a shoulder or piston 11 of a tube 12, such latter tube being slidably carried within the main tube 2 and projecting outwardly through the upper end thereof. This inturned edge or flange 10 is clamped in position by means of a washer 13 held in position by a shouldered portion of a fitting 14 screwed into the lower end of the slidable tube 12. A spring 15 loosely surrounds the tube 12 and bears at its outer end against the flange of the tube 2 and at its inner end against the flange or piston 11 of the tube 12.

The conventional type of filling valve, as indicated at 16, is screwed into the upper end of the tube 12 and may be replaced and renewed as desired.

The upper portion of the tube 12 is threaded, as indicated at 17 and the upper flange 18 of a graduated sleeve 19 is received upon such portion and clamped in position by means of nuts 20, so that such graduated sleeve 19 moves with the tube 12 when such tube is operated by the pressure of the air within the inner tube 1. In order to protect the graduated sleeve 19 from damage and also to secure the device rigidly in place on the felly of a wheel, an external sleeve 21 is provided with a threaded nut like bottom portion 6 engaging the tube 2. This sleeve 21 is spaced outwardly from the tube 2 throughout the major portion of its extent and slidably receives the graduated sleeve or tube 19, as illustrated.

It will thus be seen that a combined filling tube and gauge has been provided which may be readily attached to the inner tube and to the wheel felly in a secure and effective manner, and which will permit ready filling of the inner tube and will at all times indicate the pressure within the inner tube.

It is to be noted that the outer sleeve 21 is adjustably mounted upon the main tube 2 and consequently may be screwed up or down on such tube. This provides for the initial adjustment of the device so that an accurate indication of the air pressure may be attained. For example any variation in the strength of the spring can be readily compensated for by this means.

It will further be seen that a combined gauge and filling tube has been provided which is of simple and rugged construction, and which is not likely to get out of order.

Although the invention has been described in considerable detail, it is to be understood that the invention may be variously embodied and is, therefore, to be limited only as claimed.

We claim:

1. A combined filling tube and gauge comprising a main tube having an externally threaded lower portion and a smooth upper portion, and having an outwardly projecting shoulder at its lower end, a nut threaded upon said tube and adapted to clamp an inner tube against said shoulder, an expansible sack positioned within said main tube, a piston loosely fitting within said main tube and secured to the upper end of said sack and communicating therewith, the lower end of said sack being secured within said shoulder, said piston having an outwardly turned lower shoulder, said main tube having an inwardly turned upper shoulder, a compression spring positioned between the shoulder of said main tube and piston, a valve carried by the upper end of said main tube, a graduated sleeve secured adjacent the upper end of said piston and slidably fitting the smooth portion of said main tube, an adjustable sleeve slidably fitting said first mentioned sleeve and having an inwardly turned threaded shoulder engaging the threaded lower portion of said main tube, whereby said last mentioned sleeve may be initially adjusted.

2. A combined filling tube and gauge comprising a main tube having a threaded lower portion provided with a shoulder, a nut screwed upon said threaded portion and adapted to clamp an inner tube against said shoulder, an outer sleeve spaced from the upper portion of said tube and having a threaded lower portion screwed upon the threaded portion of said tube, a graduated sleeve positioned between said outer sleeve and said tube, a movable tube positioned within said main tube and having a filling valve therein, said movable tube being rigidly attached to said graduated sleeve, an inflatable flexible member positioned within said main tube and bearing against said movable tube, and a spring urging said movable tube inwardly.

In testimony that we claim the foregoing we have hereunto set our hands at Oconomowoc, in the county of Waukesha and State of Wisconsin.

ELMER L. LARSON.
CHARLES A. BRAUNGER.